United States Patent
Hadden et al.

(10) Patent No.: US 8,444,121 B2
(45) Date of Patent: May 21, 2013

(54) SYSTEMS FOR DAMPING VIBRATIONS FROM A PAYLOAD

(75) Inventors: Steven Hadden, Poeria, AZ (US); Paul Buchele, Glendale, AZ (US); Jim Boyd, Phoenix, AZ (US)

(73) Assignee: Honeywell International Inc., Morristown, NJ (US)

( * ) Notice: Subject to any disclaimer, the term of this patent is extended or adjusted under 35 U.S.C. 154(b) by 751 days.

(21) Appl. No.: 12/059,933

(22) Filed: Mar. 31, 2008

(65) Prior Publication Data
US 2009/0243169 A1 Oct. 1, 2009

(51) Int. Cl.
*F16F 9/43* (2006.01)
*F16M 1/00* (2006.01)

(52) U.S. Cl.
USPC ........................................ 267/64.28; 267/136

(58) Field of Classification Search
USPC ........... 188/297–298, 266; 248/550; 267/136, 267/64.28
See application file for complete search history.

(56) References Cited

U.S. PATENT DOCUMENTS

| | | | | |
|---|---|---|---|---|
| 5,305,981 A * | 4/1994 | Cunningham et al. | ........ | 248/550 |
| 5,356,110 A * | 10/1994 | Eddy | .............................. | 248/550 |
| 6,003,849 A * | 12/1999 | Davis et al. | .............. | 267/140.14 |
| 6,082,508 A * | 7/2000 | Davis | ............................ | 188/298 |
| 6,851,529 B2 * | 2/2005 | Jones et al. | .................... | 188/378 |
| 6,959,795 B2 * | 11/2005 | Kienholz | ................... | 188/267.1 |
| 2005/0217954 A1 * | 10/2005 | Hindle et al. | ................. | 188/298 |
| 2006/0180417 A1 * | 8/2006 | Ruebsamen et al. | ......... | 188/297 |

FOREIGN PATENT DOCUMENTS

| | | |
|---|---|---|
| EP | 0538811 A1 | 4/1993 |
| JP | 2006275249 | 4/2008 |
| WO | 2005111726 A2 | 11/2005 |

OTHER PUBLICATIONS

EP Search Report, 09151250.9 dated Jul. 7, 2009.

* cited by examiner

*Primary Examiner* — Bradley King
*Assistant Examiner* — Vishal Sahni
(74) *Attorney, Agent, or Firm* — Ingrassia Fisher & Lorenz, P.C.

(57) ABSTRACT

Systems are provided for damping vibrations from a payload. In an embodiment, and by way of example only, the system includes an isolation strut and a gas line. The isolation strut includes a bellows and a piston. The bellows has a first end and a second end, the first end being enclosed, and the second end attached to the piston to define a chamber. The piston includes a damping annulus therethrough having a gas inlet and a gas outlet. The gas inlet provides flow communication to the chamber of the bellows. The gas line is coupled to the isolation strut and is in fluid communication with the gas outlet thereof. The system is hermetically sealed to contain a gas therein.

8 Claims, 3 Drawing Sheets

US 8,444,121 B2

SYSTEMS FOR DAMPING VIBRATIONS FROM A PAYLOAD

STATEMENT REGARDING FEDERALLY SPONSORED RESEARCH OR DEVELOPMENT

This invention was made with Government support under contract number ZAS1FN18. The Government has certain rights in this invention.

TECHNICAL FIELD

The inventive subject matter generally relates to systems for damping vibration, and more particularly relates to systems adapted to damp vibration in a low temperature environment.

BACKGROUND

A precision pointing system carrying a sensor, such as a telescope, as its payload may be susceptible to disturbances that produce structural vibrations and, consequently, pointing errors. Such vibrations may be attributed to mechanical components or assemblies, such as reaction wheel assemblies that are used as actuators in the precision pointing system. For the most part, because these systems tend not to have significant, inherent damping, these structural vibrations may degrade system performance and even cause structural fatigue over time.

To minimize structural vibrations, a system of vibration isolators is typically used to damp the structure and isolate the payload. A well-documented type of vibration isolator operates as a three-parameter vibration isolation system and includes a hollow shaft, a piston, and a main spring. The piston receives vibration from the payload and is configured to slidably move through the shaft in response to the vibration. A flange extends radially from a midsection of the piston and has a top surface that is coupled to a first sealed bellows and a bottom surface that is coupled to a second sealed bellows. Each of the bellows has a chamber that is filled with a fluid, such as a liquid. Thus, when the piston moves axially through the shaft, fluid flows from one of the bellows chambers to the other. The shaft and piston are disposed within the main spring, which provides axial stiffness to the vibration isolator in general. Although conventional vibration isolators, such as the one described above, are generally useful for damping vibrations in most circumstances, they may not operate as desired when employed in cryogenic (e.g., below about −120° C.) environments. In particular, the fluid that fills the chamber of the vibration isolator may change in viscosity and/or from a liquid state to a solid state when exposed to such temperatures.

Recently, magnetic isolation struts may have been used in cryogenic environments. Magnetic isolation struts include a shaft that receives vibration and a magnetic element adjacent the shaft that generates an electromagnetic force that can cause the shaft to resist motion to thereby dissipate the vibration. However, magnetic isolation struts may be relatively heavy, and may not be suitable for weight-limited applications. Moreover, magnetic isolation struts may not be as effective as desired in damping certain magnitudes of vibrations. Additionally, the magnetic element may produce a magnetic field, which may undesirably affect some payloads.

Accordingly, it is desirable to have a vibration damping system that may be used in a cryogenic environment while minimally affecting the operability of surrounding components, such as the payload. In addition, it is desirable to have a system that is relatively lightweight. Furthermore, other desirable features and characteristics of the inventive subject matter will become apparent from the subsequent detailed description of the inventive subject matter and the appended claims, taken in conjunction with the accompanying drawings and this background of the inventive subject matter.

BRIEF SUMMARY

Systems are provided for damping vibrations of a payload. In an embodiment, and by way of example only, the system includes an isolation strut and a gas line. The isolation strut includes a bellows and a piston. The bellows has a first end and a second end, the first end being enclosed, and the second end attached to the piston to define a chamber. The piston includes a damping annulus therethrough having a gas inlet and a gas outlet. The gas inlet provides flow communication to the chamber of the bellows. The gas line is coupled to the isolation strut and is in fluid communication with the gas outlet thereof. The system is hermetically sealed to contain a gas therein.

In another embodiment, and by way of example only, the system includes a plurality of isolation struts and a gas line. The plurality of isolation struts each include a bellows and a piston, where the bellows has a first end and a second end, the first end being enclosed and the second end attached to the piston to define a chamber, and the piston includes a damping annulus therethrough having a gas inlet and a gas outlet, the gas inlet providing flow communication to the chamber of the bellows. The gas line is coupled to each of the isolation struts of the plurality of isolation struts and fluidly couples the plurality of isolation struts to each other. The system is hermetically sealed to contain an inert gas therein.

BRIEF DESCRIPTION OF THE DRAWINGS

The inventive subject matter will hereinafter be described in conjunction with the following drawing figures, wherein like numerals denote like elements.

DETAILED DESCRIPTION

The following detailed description is merely exemplary in nature and is not intended to limit the inventive subject matter or the application and uses of the inventive subject matter. Furthermore, there is no intention to be bound by any theory presented in the preceding background or the following detailed description.

Figure 1:
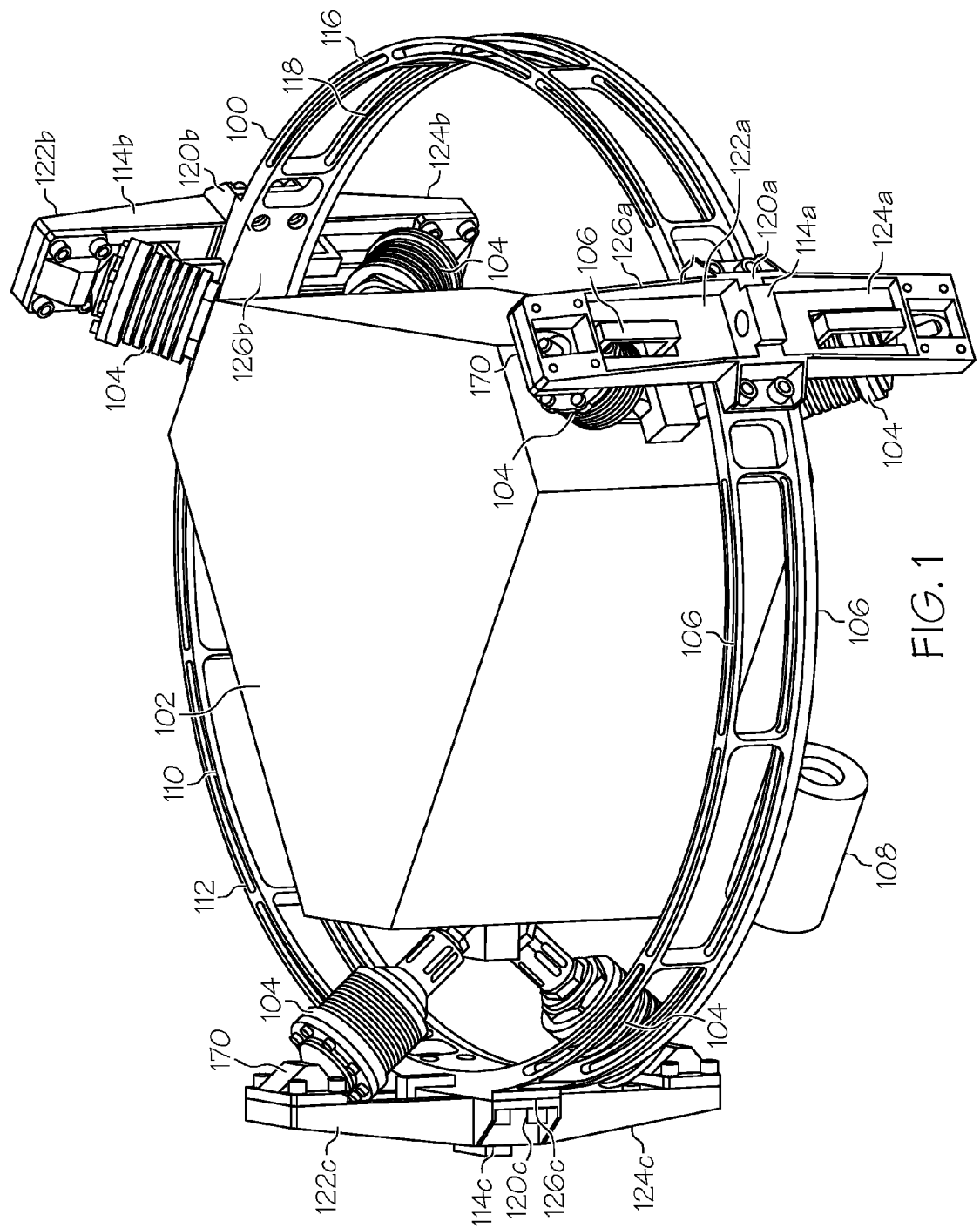
FIG. 1 is a perspective view of a system for damping vibration, according to an embodiment.

FIG. 1 is a perspective view of a system 100 for damping vibrations from a payload 102, according to an embodiment. The system 100 is configured to be used in extreme cold environments, such as in temperatures below about −120° C., although the system 100 may be used in environments having higher temperatures, as well (e.g., temperatures about −55° C., or higher). The system 100 may be adapted to damp vibrations from any type of payload 102. In an embodiment, the payload 102 may be a sensor, such as a telescope, or may be any other device in which operability thereof may be affected by structural vibration. In this regard, the system 100 includes at least a plurality of isolation struts 104, a gas line 106, and an accumulator 108.

Each isolation strut 104 is mounted directly or indirectly to the payload 102 and configured to receive and damp vibration therefrom. To optimize vibration damping of the payload 102, the isolation struts 104 may be arranged in a desired configuration. For example, six isolation struts 104 may be placed in a hexapod configuration, as shown in FIG. 1. In an embodiment, the six isolation struts 104 may form three pairs of first and second struts 104 arranged in a bipod configuration, where the three pairs of struts are arranged in a tripod configuration. In other embodiments, more or fewer isolators 104 may be included and they may be arranged in different configurations.

To maintain the system 100 in the desired configuration, the isolation struts 104 may be coupled to a mounting structure 110, in an embodiment. The mounting structure 110 may be made of a relatively rigid material capable of maintaining structural integrity when subjected to temperatures below about −120° C., in an embodiment. Suitable materials include stainless steel, titanium, alloys thereof, and other similar materials. These and other materials may be employed for mounting structures 110 that may be subjected to higher temperatures, such as temperatures about −55° C. or higher. Additionally, the mounting structure 110 may be sized and dimensioned to correspond with the desired configuration of the system 100. In an embodiment, the mounting structure 110 may be made up of a hoop 112 and a plurality of strut brackets 114a, 114b, 114c, where the hoop 112 is configured to surround the payload 102. For example, in an embodiment in which the payload 102 has a weight of between about 9 kg and about 90 kg and a width of at least 25 cm, the hoop 112 may have a diameter of between about 10 cm and about 50 cm. In other embodiments, the dimensions of the payload 102 may be different; thus, the hoop 112 may have smaller or larger dimensions. Although the hoop 112 includes two concentric rings 116, 118 in the depicted embodiment, the hoop 112 may be alternatively made up of a single ring or more than two rings. Moreover, although the two rings 116, 118 are shown as being substantially concentric, they may not be in other embodiments. In addition, the hoop 112 may have a non-circular shape, in other embodiments.

The strut brackets 114a, 114b, 114c are attached to the rings 116, 118. In an embodiment, each strut bracket 114a, 114b, 114c includes a fastening section 120a, 120b, 120c, a first mounting section 122a, 122b, 122c, and a second mounting section 124a, 124b, 124c. The first mounting section 122a, 122b, 122c extends axially from a respective fastening section 120a, 120b, 120c in a first direction, and the second mounting section 124a, 124b, 124c extends axially from a respective fastening section 120a, 120b, 120c in a second direction. In an embodiment, the first and the second direction are aligned with each other. Each strut bracket 114a, 114b, 114c has an axial length of between about 15 cm and about 30 cm. However, in other embodiments, the axial lengths of the strut brackets 114a, 114b, 114c may be shorter or longer, depending on the particular dimensions of the payload 102 and/or the isolation struts 104. In another embodiment, the axial lengths of the strut brackets 114a, 114b, 114c may depend on a configuration of the mounting sections 122a, 122b, 122c, 124a, 124b, 124c. For example, the first direction of the first mounting sections 122a, 122b, 122c may be angled relative to the second direction of the corresponding second mounting sections 124a, 124b, 124c to thereby form a V-shape.

Although all of the strut brackets 114a, 114b, 114c are shown as having substantially equal axial lengths in this embodiment, the axial lengths may differ from bracket to bracket or from one end to the other in other embodiments. Additionally, although all of the strut brackets 114a, 114b, 114c are shown as being oriented on the mounting structure 110 in substantially the same manner, consequently being parallel to each other, this may not be the case in other embodiments. In particular, the orientation of the strut brackets 114a, 114b, 114c may depend on the desired configuration of the system 100 (e.g., hexapod configuration, etc.) and thus, the strut brackets 114a, 114b, 114c may not be parallel, in other embodiments.

The fastening section 120a, 120b, 120c of each strut bracket 114a, 114b, 114c may attach to one or both of the rings 116, 118 via any one of numerous conventional mounting configurations. In the example shown in FIG. 1, fastening plates 126a, 126b, 126c extend between the rings 116, 118 at particular locations around the hoop 112, and the fastening sections 120a, 120b, 120c of the strut brackets 114a, 114b, 114c are coupled directly to respective fastening plates 126a, 126b, 126c. The two may be coupled via bolts, screws, or other conventional fastening mechanisms. Although three fastening plates 126a, 126b, 126c are shown to correspond to the three strut brackets 114a, 114b, 114c, more or fewer may alternatively be included. For example, each isolation strut 104 may be mounted to a corresponding fastening plate, in another embodiment, or more than two strut brackets may be mounted to a fastening plate, in still another embodiment. Thus, the number of fastening plates may or may not correspond to number of strut brackets.

The mounting structure 110 is depicted as surrounding an entirety of the payload 102; however, this may not be the case in other embodiments. For example, the mounting structure 110 may be a platform or a block in other embodiments, and the payload 102 may be mounted onto the platform. In another embodiment, the mounting structure 110 may partially surround the payload 102. In other embodiments, the payload 102 may at least partially surround the mounting structure 110.

Figure 2:
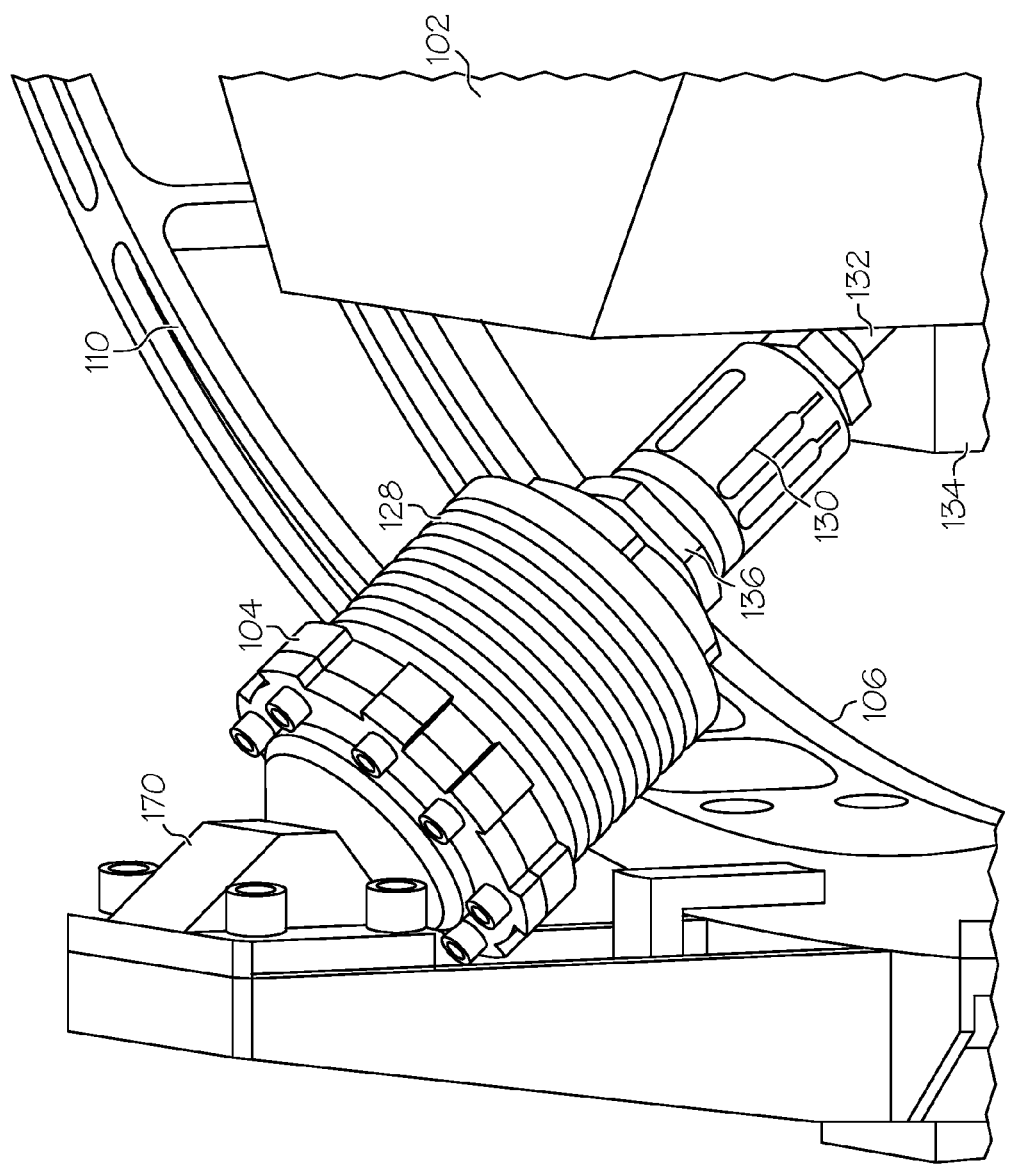
FIG. 2 is a close-up view of an isolation strut included in the system of FIG. 1, according to an embodiment.

In any event, no matter the particular configuration of the mounting structure 110, each of the isolation struts 104 is also coupled to the payload 102, either directly as in this embodiment, or through brackets (not shown) in other embodiments. FIG. 2 is a close-up view of one of the isolation struts 104 included in the system 100 depicted in FIG. 1, according to an embodiment. The isolation strut 104 includes an outer housing 128 and a flexure 130. The outer housing 128 is generally cylindrical and is configured to house damping components therein. The outer housing 128 may be further adapted to act as a spring to attenuate a portion of the vibration received from the payload 102. In such case, the outer housing 128 may be made of a deformable material, such as steel or titanium, with both ends fastened to the strut. In another embodiment, the outer housing 128 may be adapted to protect the damping components therein from damage. Thus, the outer housing 128 may alternatively be made of metal, or elastomer.

The flexure 130 extends from an end of the outer housing 128 to couple the isolation strut 104 to the payload 102. In an embodiment, a first end 132 of the flexure 130 may be attached either directly or indirectly (e.g., via mounting flanges 134) to the payload 102 to thereby receive vibration therefrom. A second end 136 of the flexure 130 may be directly or indirectly coupled to the damping components within the outer housing 128 so that the vibrations from the payload 102 may be transmitted to the damping components. In this regard, the flexure 130 may be made of an elastic metal or non-metal material.

Figure 3:
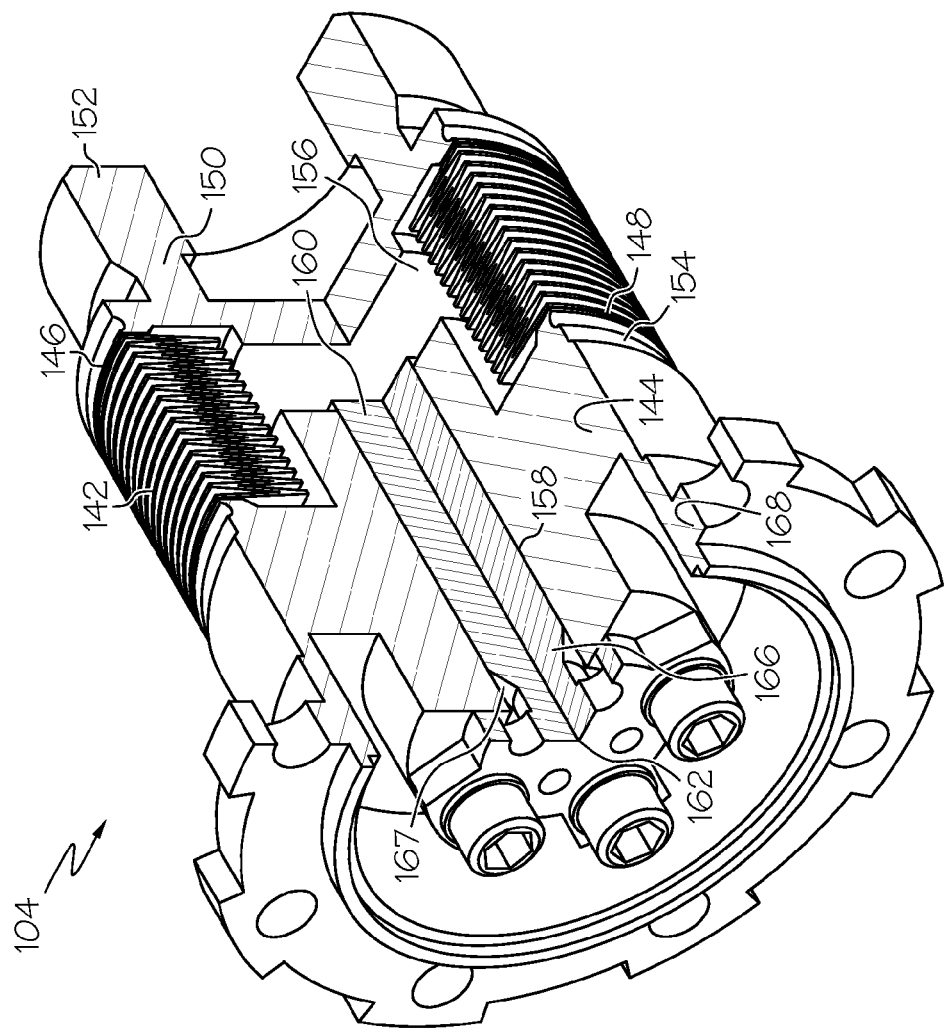
FIG. 3 is a cut-away view of a portion of the isolation strut shown in FIG. 2, according to an embodiment.

With additional reference to FIG. 3, a cut-away view of a portion of the isolation strut 104 is provided, according to an embodiment. In an embodiment, each of the isolation struts 104 in the system 100 is magnet-free and includes a bellows 142 and a piston 144. Each of the bellows 142 and piston 144 may be made of materials that are conventionally used in the manufacturing of components that are employed in space flight applications. For example, the bellows 142 and piston 144 may be made of stainless steel, or any other suitable steel, or of titanium or an alloy thereof, or of non-metallic material. In another embodiment, the bellows 142 may be replaced by a suitable elastic or deformable sealed connection permitting relative motion between flexure 130 and piston 144.

The bellows 142 has a first end 146 and a second end 148. The first end 146 is attached to and enclosed via an end cap 150. The end cap 150 may include an axially extending flange 152 adapted to attach to the second end 136 of the flexure 130 (shown in FIG. 2). The second end 148 of the bellows 142 is coupled to a first end 154 of the piston 144. As a result, a chamber 156 is defined by an inner surface of the bellows 148, the end cap 150, and the piston 144.

The chamber 156 communicates with a damping annulus 158 that extends through the piston 144. The damping annulus 158 has a gas inlet 160 for receiving gas from the chamber 156, a gas outlet 162 through which gas is expelled from the isolation strut 104, and a channel extending between the gas inlet 160 and gas outlet 162. Accordingly, the gas inlet 160 provides flow communication to the chamber 156 of the bellows 142. In an embodiment, the damping annulus 158 may be formed in a shaft 166 that is inserted into and fixed within a passage 167 formed through the piston 144, as shown in FIG. 3. However, in other embodiments, the shaft 166 may not be included and the passage 167 may act as the damping annulus 158.

To provide a particular amount of damping, the bellows 142 and the damping annulus 158 may have particular dimensions. For example, the bellows 142 may have an outer diameter that is between about 1 cm and about 15 cm, an inner diameter that is smaller than the outer diameter, and an axial length of between about 1 cm and about 15 cm, to thereby yield a chamber volume of between about 0.004 L and about 0.4 L. The damping annulus 158 may have a diameter of between about 2.5 microns and about 250 microns and an axial length of between about 2.5 cm and about 250 cm (if using a zigzag or circuitous bellows stroke path). In this way, the isolation strut 104 may be capable of damping vibrations having a magnitude of between about 0.25 microns and about 0.25 cm. To increase or decrease damping capabilities of the strut 104, one or more of the aforementioned dimensions may be decreased or enlarged.

As alluded to above and with additional reference now to FIGS. 1 and 2, each damping annulus 158 includes a gas outlet 162 that allows the isolation strut 104 to fluidly communicate with the gas line 106. In this regard, a gas line connector 170 may be used to sealingly couple the isolation strut 104 to the gas line 106. In an embodiment, the piston 144 may have an outer flange 168, which is either integrally formed as part of or is coupled thereto, that extends radially outwardly relative to the gas outlet 162 and couples to the gas line connector 170. Thus, gas may flow to or from the gas outlet 162 and to or from the gas line 106 without leakage. The gas line connector 170 also may be used to mount the isolation strut 104 to the strut bracket 114a, 114b, 114c, in an embodiment.

The gas line 106 extends between all of the isolation struts 104 to provide fluid communication therebetween. In an embodiment, the gas line 106 couples adjacent gas line connectors 170 to each other. In another embodiment, the gas line 106 may couple adjacent isolation struts 104 directly to each other. In any case, the gas line 106 is made up of tubing, piping, connectors, and/or other suitable components capable of allowing gas to flow therethrough. Additionally, the component making up the gas line 106 may be made of a material that is capable of being hermetically sealed to contain the gas in the system 100 and to remain sealed when exposed to temperatures below about −55° C., in an embodiment, and below about −120° C., in other embodiments. Suitable materials include, but are not limited to stainless steel.

To operate, the system 100 includes gas therein that is pressurized to a desired pressure level. The gas is disposed in at least all of the isolation struts 104 (e.g., the chambers 156 and damping annuli 158 of each) and in the gas line 106 extending therebetween. The gas may be an inert gas or another gas capable of remaining in a gaseous phase when subjected to temperatures below about −55° C., in an embodiment, and below about −120° C., in other embodiments. Suitable gases include, but are not limited to, argon. In an embodiment, the desired pressure level may be a pressure magnitude suitable for the system 100 to damp a particular magnitude of vibration when exposed to cryogenic temperatures. For example, the desired pressure level may between about 0.5 atm and about 70 atm. In other embodiments, the desired pressure level may be less or greater and may depend on the particular dimensions of the bellows 142, damping annulus 158, and the gas line 106, and the gas selected for use in the system 100.

In some embodiments, a means for supplying additional gas to the system 100 may be desired in order to change the pressure thereof from a first pressure to a second, desired pressure. In such case, the system 100 may include an accumulator 108 (FIG. 1). The accumulator 108 may be a device capable of storing an additional volume of the gas and supplying additional gas to the system 100 when the first pressure is below a threshold pressure. The threshold pressure may be equal to the desired pressure, or may be greater than the desired pressure. Thus, for example, if the desired pressure of the system 100 is 7 atm and the system 100 has a first pressure of 6 atm, then the accumulator 108 may supply additional gas to the system 100, until the pressure thereof is at a second pressure that is substantially equal to the desired pressure. In an embodiment, the accumulator 108 is coupled to the gas line 106. For example, the accumulator 108 may be located between two isolation struts 104; however, in other embodiments, the accumulator 108 may be positioned on an isolation strut 104 or on any other portion of the system 100, as long as fluid communication with the system 100 is provided. In another embodiment, multiple accumulators may be used, of the same or different pressures, and of the same or different volumes.

Systems have now been provided that may be used in a cryogenic environment (e.g., temperatures below about −120° C.). The systems may also be used in non-cryogenic environments, such as in temperatures about −55° C., or higher. Compared to similarly sized conventional cryogenic isolation systems, the system described above may exhibit increased damping. The increased damping may reduce amplification at an isolation system resonance. In addition, the system described above may have a roll-off rate (e.g. −40 dB/decade) that is substantially similar to roll-off rates of non-cryogenic conventional three-parameter isolation systems. The roll-off rate, as used herein, may be defined as a slope of a transmissibility transfer function at frequencies higher than an isolation system cross-over frequency. Moreover, the systems described above may be relatively lightweight and simpler to manufacture than other isolation systems.

While at least one exemplary embodiment has been presented in the foregoing detailed description of the inventive subject matter, it should be appreciated that a vast number of variations exist. It should also be appreciated that the exemplary embodiment or exemplary embodiments are only examples, and are not intended to limit the scope, applicability, or configuration of the inventive subject matter in any way. Rather, the foregoing detailed description will provide those skilled in the art with a convenient road map for implementing an exemplary embodiment of the inventive subject matter. It being understood that various changes may be made in the function and arrangement of elements described in an exemplary embodiment without departing from the scope of the inventive subject matter as set forth in the appended claims.

What is claimed is:

1. A system for damping vibrations from a payload, the system comprising:
   a plurality of isolation struts, each isolation strut of the plurality of isolation struts comprising:
      a cylindrical outer housing comprising a deformable material;
      a flexure extending from an end of the outer housing to couple the isolation strut to the payload, the flexure having a first end and a second end, wherein the flexure first end is attached to the payload to thereby receive vibration therefrom, wherein the flexure second end is coupled to one or more damping components disposed within the outer housing, and wherein the flexure comprises and elastic material;
      a bellows, a piston, and an end cap, the bellows comprising a first end and a second end, the piston comprising a first end and a second end, and the end cap comprising an axially extending flange, wherein the axially extending flange is adapted to attach to the flexure second end, and wherein the bellows second end is coupled to the piston first end, thereby defining a chamber that is sealed at one end defined by an inner surface of the bellows, the end cap, and the piston; and
      a damping annulus extending through the piston the damping annulus comprising a gas inlet for receiving a gas from the chamber and a gas outlet through which the gas is expelled from the isolation strut, the gas inlet providing flow communication between the chamber and the damping annulus, wherein the damping annulus comprises a channel extending between the gas inlet and the gas outlet, and wherein the damping annulus is formed in a shaft that is inserted into and fixed within a passage formed through the piston;
   a single gas line comprising tubing or piping sealingly coupled to each isolation strut of the plurality of isolation struts with a plurality of gas line connectors, each gas line connector of the plurality of gas line connectors sealingly coupling a respective isolation strut of the plurality of isolation struts to the single gas line so that the gas line is in fluid communication with the gas outlet of each respective isolation strut of the plurality of isolation struts, each gas line connector of the plurality of gas line connectors being coupled, at each isolation strut of the plurality of isolation struts, to an outer flange of the piston that extends radially outward relative to the gas outlet, thereby preventing relative movement between the gas line connector and the gas outlet;
   a single mounting structure to which the single gas line is mounted; and
   a plurality of strut brackets mounted to the single mounting structure and having each isolation strut of the plurality of isolation struts mounted thereto, wherein each gas line connector of the plurality of gas line connects mounts each isolation strut of the plurality of isolation struts to each strut bracket of the plurality of strut brackets;
   wherein the system is hermetically sealed to contain a gas therein.

2. The system of claim 1, further comprising an accumulator coupled to the single gas line, the accumulator adapted to store an additional volume of the gas and to supply a portion of the gas to the system, when a pressure of the system is below a threshold pressure.

3. The system of claim 1, wherein the plurality of isolation struts is disposed in a hexapod configuration.

4. The system of claim 3, wherein the plurality of isolation struts further comprises three pairs of isolation struts, each including a first isolation strut and a second isolation strut disposed in a bipod configuration.

5. The system of claim 1, further comprising a gas, wherein the gas is capable of remaining in a gaseous phase when subjected to temperatures below about −55° C.

6. The system of claim 5, wherein the gas comprises an inert gas.

7. The system of claim 1, wherein each of the plurality of isolation struts are magnet-free.

8. The system of claim 1, wherein the flexure comprises a non-metal material.

* * * * *